A. L. THOMPSON.
VEHICLE COUPLING.
APPLICATION FILED MAR. 12, 1913.
1,103,163.
Patented July 14, 1914.
2 SHEETS—SHEET 1.
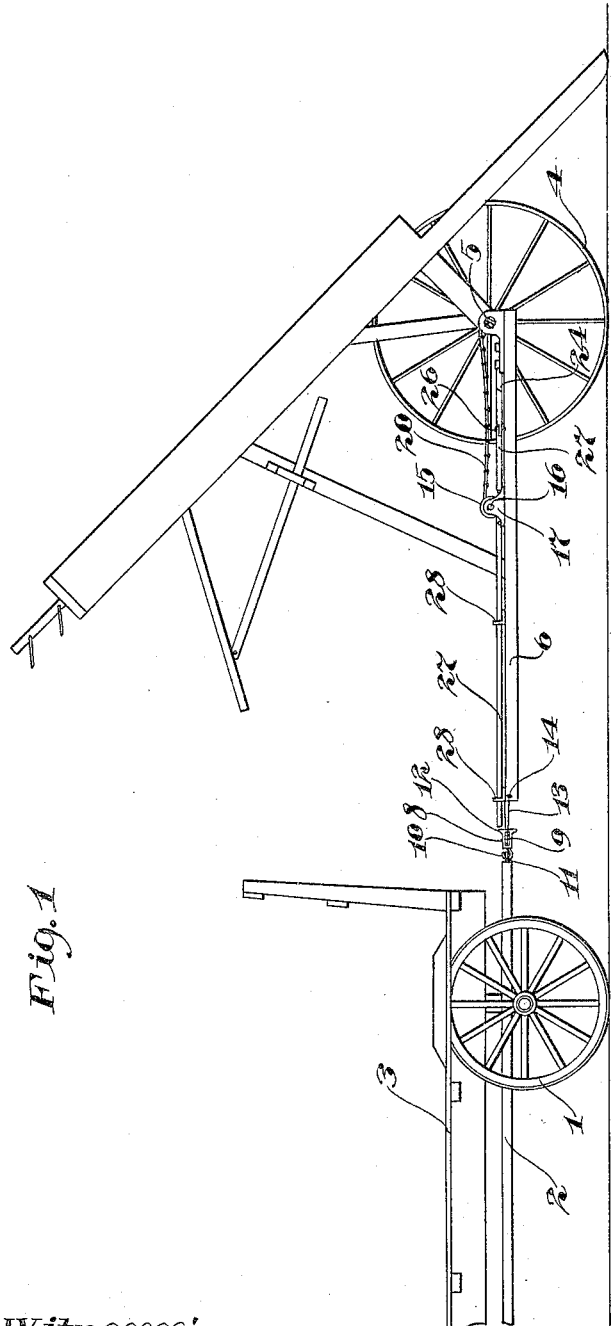
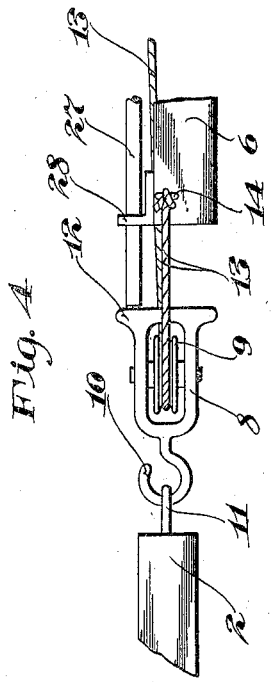
Witnesses:
E. C. Skinkle
Geo. Knutson
Inventor:
Aaron L. Thompson
By his Attorneys:
Williamson Murchard

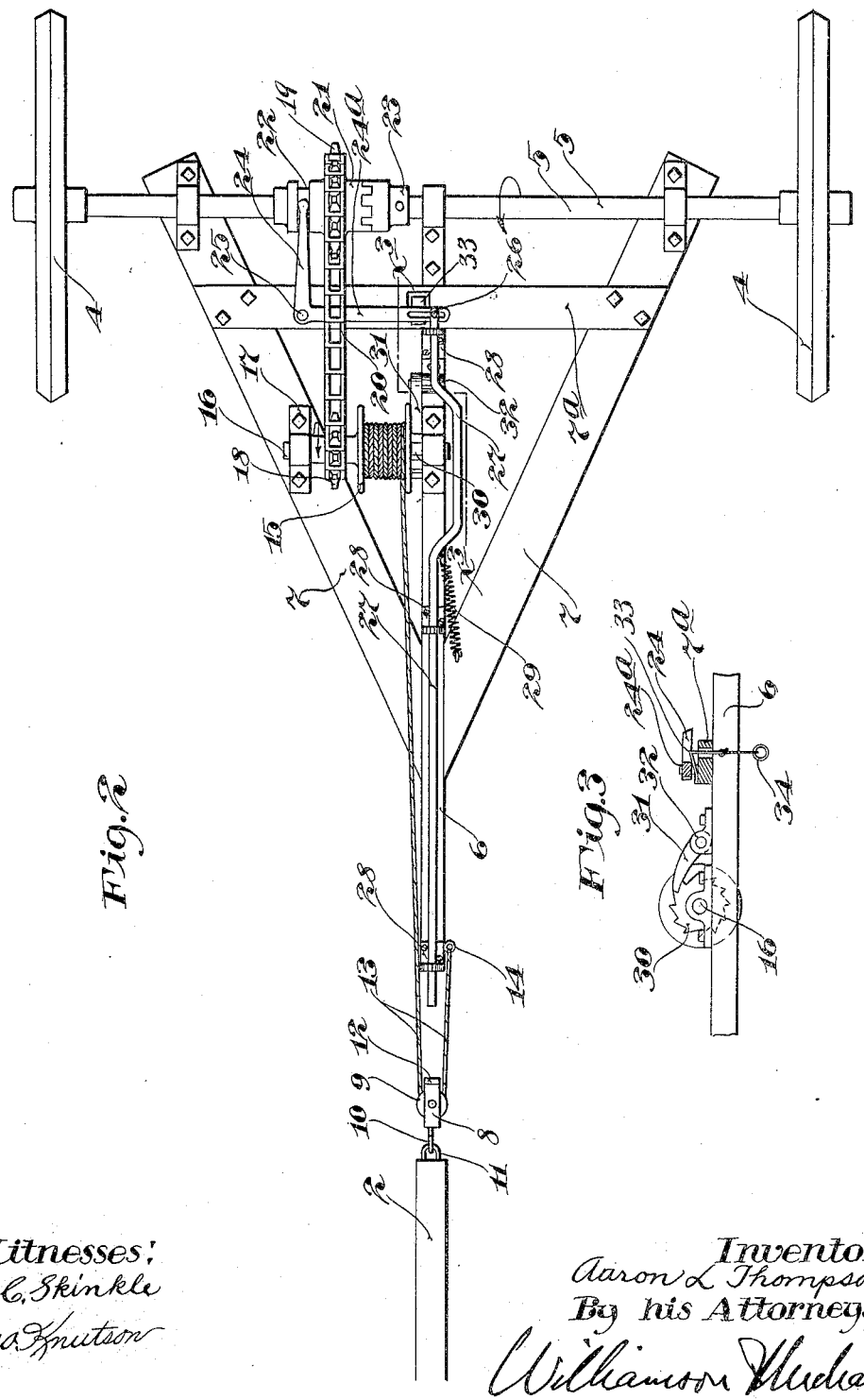

UNITED STATES PATENT OFFICE.

AARON L. THOMPSON, OF LANSING, MINNESOTA.

VEHICLE-COUPLING.

1,103,163.  Specification of Letters Patent. Patented July 14, 1914.

Application filed March 12, 1913. Serial No. 753,755.

*To all whom it may concern:*

Be it known that I, AARON L. THOMPSON, a citizen of the United States, residing at Lansing, in the county of Mower and State of Minnesota, have invented certain new and useful Improvements in Vehicle-Couplings; and I do hereby declare the following to be a full, clear, and exact description of the invention, such as will enable others skilled in the art to which it appertains to make and use the same.

My invention has for its object to provide an improved coupling device for detachably connecting vehicles one to the other, and is especially adapted for use in connecting hay loader trucks to wagons equipped with hay racks.

To the above ends, generally stated, the invention consists of the novel devices and combinations of devices hereinafter described and defined in the claims.

When hay loaders are used in gathering hay on low and soft ground, it is often impossible for the draft animals to back the wagon with the hay rack into a position to connect the pole of the hay loader thereto, thus making it necessary for the men to lift the rear end of the wagon bodily and swing the same into line with the pole of the hay loader.

My invention provides a coupling device secured to a hay loader by means of an extensible connection, whereby the hay rack may be turned in front of the hay loader to bring the rear end thereof in line with the pole of the hay loader but at a distant point therefrom. The coupling device is then carried forward and secured to the wagon or hay rack. During the initial forward movement of the wagon, the extensible connection operated by suitable mechanism from the traction wheels of the hay loader draws said hay loader forward at a greater speed than the travel of the wagon until the same has reached its proper position for loading onto the hay rack, at which time the operating mechanism is automatically tripped out of action.

The invention is illustrated in the accompanying drawings, wherein like characters indicate like parts throughout the several views.

Referring to the drawings: Figure 1 is a side elevation of a wagon and hay rack having detachably connected thereto, by means of my improved coupler, a hay loader; Fig. 2 is a plan view, on an enlarged scale, of the parts shown in Fig. 1, some parts being removed and other parts being broken away; Fig. 3 is a detail view partly in side elevation and partly in vertical section, taken on the line $x^3$—$x^3$ of Fig. 2; and Fig. 4 is a detail view showing a portion of the wagon reach and the pole of the hay loader connected by the improved coupling device.

The numeral 1 indicates the rear wheels of an ordinary farm wagon, and the numeral 2 indicates the wagon reach. Mounted on the wagon running gear is a hay rack indicated, as an entirety, by the numeral 3. Detachably secured to the wagon reach 2, by means of the improved coupling device, is a hay loader. Of the parts of the hay loader, it is only necessary, for the purposes of this case, to refer to the traction wheels 4, to which is secured, for rotation therewith, an axle 5. To the axle 5 is secured a short pole 6 and diagonal brace bars 7, secured to the intermediate and opposite sides of the pole 6.

Referring now to my improved coupling device, the numeral 8 indicates a block having journaled therein a sheave 9. Integrally formed with the front end of the block 8 is a hook 10, adapted to be secured to an eye 11, shown in the drawing as anchored in the rear end of the reach 2 but, of course, said eye may be attached to any convenient part of the wagon or hay rack. The rear end of the block 8 terminates in an expanded striking flange 12, the purpose of which will presently appear. The intermediate portion of a cable 13 is passed through the block 8 and over the pulley 9. One end of this cable 13 is anchored to an eye 14, secured to the forward end and one side of the hay loader pole 6. The other end of the cable 13 extends along the opposite side of the pole 6 to which the eye 14 is secured, and is wound on a flange windlass drum 15 secured to a horizontal transversely extended shaft 16. Said shaft 16 is journaled in bearings 17 secured, one to the pole 6 and the other to one of the brace bars 7.

Rigidly secured to the shaft 16 is a relatively small sprocket wheel 18, over which and a relatively large sprocket wheel 19 on the shaft 5 runs a sprocket chain 20. The hub of the sprocket wheel 19 is loosely and slidably mounted on the shaft 5, and one end thereof is provided with a half clutch 21 and the other end thereof is provided with a groove 22. Coöperating with the half clutch 21 and rigidly secured to the shaft 5 is a half clutch 23. For sliding the hub of the sprocket 19 on the shaft 5, a shipper lever 24 is pivotally secured at 25 to a transverse bar 7ᵃ, secured, at its ends, to the brace bars 7. The free end of the shipper lever 24 projects into the groove 22 on the hub of the sprocket wheel 19, and its pivoted end has integrally formed thereon a laterally projecting arm 24ᵃ, which extends substantially parallel with the shaft 5. To the free end of the arm 24ᵃ is secured, by means of a slot and pin connection 26, one end of a trip rod 27. This trip rod 27 is slidably mounted in three bearings 28, secured to the upper face of the pole 6. A coiled spring 29, anchored, at one end, to the pole 6 and, at its other end, to the trip rod 27, tends to yieldingly hold the trip rod 27 in an operative position with its free end projecting forward of the front end of the pole 6 and with the half clutches 21 and 23 interlocked one with the other.

During the advance movement of the hay loader, the windlass 15 is rotated in the direction of the arrow marked on Fig. 2. During this rotation of the windlass drum 15, the cable 13 is wound thereon, thereby drawing the hay loader forward at a speed greater than the travel of the hay rack to which the same is attached. At the final winding of the cable 13 on the windlass drum 15, the free end of the trip rod 27 strikes the flange 12 of the block 8, thereby forcing said trip rod 27 rearward against the tension of the spring 29 and sliding the half clutch 21 out of engagement with the half clutch 23. To prevent unwinding of the cable 13 from the windlass drum 15, thereby keeping the pole 6 secured in close arrangement with the reach 2, a ratchet wheel 30 is rigidly secured to the shaft 16 with which coöperates a pawl 31, pivotally secured to a bearing 32 on the pole 6.

To lock the half clutch 21 in an inoperative position out of engagement with the half clutch 23, a spring latch 33 is secured to the cross bar 7ᵃ. Normally, the arm 24ᵃ extends in front of the latch 33, as best shown in Fig. 3, but when the trip rod 27 is forced rearward, by its engagement with the flange 12, said arm 24ᵃ is forced over said latch 33. In this position of the latch 33, the trip rod 27 is held against the tension of the spring 29. The free end of the latch 33 works through a perforation formed in the cross bar 7ᵃ and is provided with a ring-equipped link 34, by which said latch may be pulled downward out of engagement with the arm 24ᵃ, in order to permit the parts held thereby to return to their operative positions.

What I claim is:

1. The combination with front and rear vehicles to be coupled, of a cable arranged to connect said two vehicles when at a distant point one from the other, means operated by one of the traction wheels of one of said vehicles to wind up said cable and thereby draw said rear vehicle into close arrangement with said front vehicle during the initial forward movement thereof, and means preventing the unwinding of said cable to thereby hold said vehicles coupled, sustantially as described.

2. The combination with front and rear vehicles to be coupled, of a cable arranged to connect said two vehicles when at a distant point one from the other, means operated by one of the traction wheels of one of said vehicles to wind up said cable and thereby draw said rear vehicle into close arrangement with said front vehicle during the initial forward movement thereof, means preventing the unwinding of said cable to thereby hold said vehicles coupled, and automatic means for tripping said traction wheel operated means out of action when said rear vehicle has reached a predetermined position with respect to said front vehicle, substantially as described.

3. The combination with front and rear vehicles to be coupled, of a sheave secured to the front vehicle, a cable passed over said sheave, anchored at one end to the rear vehicle and having its other end wound on a windlass drum on said rear vehicle, means for rotating said windlass drum from the traction wheels of said rear vehicle, means preventing the unwinding of said cable from said drum to thereby hold said vehicles coupled, and means for tripping said windlass drum operating means out of action at a predetermined time, substantially as described.

4. The combination with front and rear vehicles to be coupled, of a sheave secured to the front vehicle, a cable passed over said sheave, anchored at one end to the rear vehicle and having its other end wound on a windlass drum on said rear vehicle, means for rotating said windlass drum from the traction wheels of said rear vehicle, means preventing the unwinding of said cable from said drum to thereby hold said vehicles coupled, and a trip rod mounted on said rear vehicle and arranged to be operated when engaged by a part on said vehicle for throwing said drum operating means out of action, substantially as described.

5. The combination with front and rear vehicles to be coupled, of a sheave secured to the front vehicle, a cable passed over said sheave, anchored at one end to the rear vehicle and having its other end wound on a windlass drum of said rear vehicle, means including coöperating half clutches for rotating said windlass drum from the traction wheels of said rear vehicle, means preventing the unwinding of the cable from said drum to thereby hold said vehicles coupled, and a trip rod mounted on the pole of said rear vehicle and arranged to be operated when engaged by a part on said front vehicle, for throwing said half clutches out of engagement one with the other, substantially as described.

6. The combination with front and rear vehicles to be coupled, of a sheave secured to the front vehicle, a cable passed over said sheave, anchored at one end to the rear vehicle and having its other end wound on a windlass drum on said rear vehicle, means including coöperating half clutches for rotating said windlass drum from the traction wheels of said rear vehicle, pawl and ratchet devices preventing the unwinding of the cable from said drum, a trip rod mounted on the pole of said rear vehicle and arranged to be operated when engaged by a part on said front vehicle, for throwing said half clutches out of engagement one with the other, a spring tending to hold said trip rod in an operative position, and a spring latch for holding said trip rod in a retracted position and said half clutches out of engagement one with the other, substantially as described.

In testimony whereof I affix my signature in presence of two witnesses.

AARON L. THOMPSON.

Witnesses:
  H. T. BANFIELD,
  E. H. STERLING.

---

Copies of this patent may be obtained for five cents each, by addressing the "Commissioner of Patents Washington, D. C."